US008954203B2

United States Patent
Arditi et al.

(10) Patent No.: US 8,954,203 B2
(45) Date of Patent: Feb. 10, 2015

(54) SYSTEMS AND METHODS FOR DISTRIBUTED POWER FACTOR CORRECTION AND PHASE BALANCING

(75) Inventors: Shmuel Arditi, Los Gatos, CA (US); Ron Hadar, Cupertino, CA (US)

(73) Assignee: Tigo Energy, Inc., Los Gatos, CA (US)

(*) Notice: Subject to any disclaimer, the term of this patent is extended or adjusted under 35 U.S.C. 154(b) by 725 days.

(21) Appl. No.: 12/562,491

(22) Filed: Sep. 18, 2009

(65) Prior Publication Data

US 2010/0332047 A1 Dec. 30, 2010

Related U.S. Application Data

(60) Provisional application No. 61/269,504, filed on Jun. 24, 2009.

(51) Int. Cl.
G05D 9/00 (2006.01)
H02J 3/18 (2006.01)
H02J 3/38 (2006.01)
H02J 13/00 (2006.01)

(52) U.S. Cl.
CPC . *H02J 3/18* (2013.01); *H02J 3/383* (2013.01); *H02J 13/0006* (2013.01); *Y02E 40/30* (2013.01); *Y04S 10/123* (2013.01); *Y02E 10/563* (2013.01); *Y04S 20/36* (2013.01); *Y02E 40/72* (2013.01)
USPC ............ 700/297; 700/286; 700/287; 700/298

(58) Field of Classification Search
USPC ......... 700/19, 20, 21, 79, 286, 291, 292, 295, 700/297, 298
See application file for complete search history.

(56) References Cited

U.S. PATENT DOCUMENTS

| | | | |
|---|---|---|---|
| 5,235,266 | A | 8/1993 | Schaffrin |
| 5,268,832 | A | 12/1993 | Kandatsu |
| 5,604,430 | A | 2/1997 | Decker et al. |
| 5,923,158 | A | 7/1999 | Kurokami et al. |
| 6,275,016 | B1 | 8/2001 | Ivanov |
| 6,448,489 | B2 | 9/2002 | Kimura et al. |
| 6,650,031 | B1 | 11/2003 | Goldack |
| 6,844,739 | B2 | 1/2005 | Kasai et al. |
| 6,894,911 | B2 | 5/2005 | Telefus et al. |
| 6,984,970 | B2 | 1/2006 | Capel |

(Continued)

FOREIGN PATENT DOCUMENTS

| | | |
|---|---|---|
| AU | 2005262278 | 7/2005 |
| DE | 4232356 | 3/1994 |

(Continued)

OTHER PUBLICATIONS

Palma, L et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

(Continued)

*Primary Examiner* — Mohammad Ali
*Assistant Examiner* — Nathan Laughlin
(74) *Attorney, Agent, or Firm* — Greenberg Traurig LLP

(57) ABSTRACT

A power management system includes a plurality of monitors, communicatively coupled together over a communications medium. Each respective monitor of the plurality of monitors is configured to capture power factor (PF) data at a corresponding distribution segment for calculation of a PF correction.

10 Claims, 6 Drawing Sheets

(56) References Cited

U.S. PATENT DOCUMENTS

| | | | |
|---|---|---|---|
| 7,061,214 | B2 | 6/2006 | Mayega et al. |
| 7,248,946 | B2 | 7/2007 | Bashaw et al. |
| 7,256,566 | B2 | 8/2007 | Bhavaraju et al. |
| 7,276,886 | B2 | 10/2007 | Kinder et al. |
| 7,518,346 | B2 | 4/2009 | Prexl et al. |
| 7,595,616 | B2 | 9/2009 | Prexl et al. |
| 7,605,498 | B2 | 10/2009 | Ledenev et al. |
| 7,719,140 | B2 | 5/2010 | Ledenev et al. |
| 2002/0109585 | A1 | 8/2002 | Sanderson |
| 2003/0085621 | A1 | 5/2003 | Potega |
| 2005/0057214 | A1 | 3/2005 | Matan |
| 2005/0057215 | A1 | 3/2005 | Matan |
| 2006/0001406 | A1 | 1/2006 | Matan |
| 2006/0174939 | A1 | 8/2006 | Matan |
| 2006/0185727 | A1 | 8/2006 | Matan |
| 2007/0059986 | A1 | 3/2007 | Rockwell |
| 2007/0228838 | A1* | 10/2007 | Delmerico et al. ............ 307/84 |
| 2007/0273351 | A1 | 11/2007 | Matan |
| 2008/0106241 | A1* | 5/2008 | Deaver et al. ................ 323/209 |
| 2008/0121272 | A1 | 5/2008 | Besser et al. |
| 2008/0122449 | A1 | 5/2008 | Besser et al. |
| 2008/0122518 | A1 | 5/2008 | Besser et al. |
| 2008/0172312 | A1* | 7/2008 | Synesiou et al. ................ 705/34 |
| 2008/0179949 | A1 | 7/2008 | Besser et al. |
| 2008/0191560 | A1 | 8/2008 | Besser et al. |
| 2008/0191675 | A1 | 8/2008 | Besser et al. |
| 2008/0224629 | A1* | 9/2008 | Melanson .................... 315/247 |
| 2008/0303503 | A1 | 12/2008 | Wolfs |
| 2009/0096211 | A1* | 4/2009 | Stiesdal ......................... 290/44 |
| 2009/0128102 | A1* | 5/2009 | Thorvaldsson ............... 323/233 |
| 2009/0189456 | A1* | 7/2009 | Skutt ............................ 307/87 |
| 2009/0283129 | A1* | 11/2009 | Foss ............................. 136/244 |
| 2010/0208501 | A1* | 8/2010 | Matan et al. .................... 363/95 |
| 2010/0327657 | A1* | 12/2010 | Kuran ........................... 307/43 |
| 2011/0304204 | A1 | 12/2011 | Avrutsky et al. |
| 2011/0304213 | A1 | 12/2011 | Avrutsky et al. |
| 2011/0304215 | A1 | 12/2011 | Avrutsky et al. |

FOREIGN PATENT DOCUMENTS

| | | |
|---|---|---|
| DE | 19961705 | 7/2001 |
| EP | 169673 | 1/1986 |
| EP | 1388774 | 2/2004 |
| ES | 2249147 | 3/2006 |
| WO | 03012569 | 2/2003 |

OTHER PUBLICATIONS

Quaschning, V. et al., "Cost Effectiveness of Shadow Tolerant Photovoltaic Systems," Euronsun 96, pp. 819-824, Sep. 16, 1996.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

International Patent Application Na PCT/US2010/029929, International Search Report and Written Opinion, Oct. 27, 2010.

Alonso, R. et al., "A New Distributed Converter Interface for PV Panels," 20th European Photovoltaic Solar Energy Conference, Barcelona, Spain, pp. 2288-2291, Jun. 6-10, 2005.

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Basso, Tim, "IEEE Standard for Interrconnecting Distributed Resources With the Electric Power System," IEEE Pes Meeting, Jun. 9, 2004.

Boostbuck.com, "The Four Boostbuck Topologies," located at http://www.boostbuck.com/TheFourTopologies.html, 2003.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Gautam, Nalin K. et al., "An Efficient Algorithm to Simulate the Electrical Performance of Solar Photovoltaic Arrays," Energy, vol. 27, No. 4, pp. 347-361, 2002.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of Pv Systems Under Real Conditions," European Workshop on Life Cycle Analysis and Recycling of Solar Modules, The "Waste" Challenge, Brussels, Belgium, Mar. 18-19, 2004.

Roman, Eduardo, et al., "Intelligent PV Module for Grid-Connectred PV Systems," IEEE Transactions on Industrial Electronics, vol. 53, No. 4, pp. 1066-1073, Aug. 2006.

Walker, Jeffrey R. et al., "Cascaded DC-DC Converter Connection of Photovoltaic Modules," IEEE Transactions on Power Electronics, vol. 19, No. 4, pp. 1130-1139, Jul. 2004.

* cited by examiner

SYSTEMS AND METHODS FOR DISTRIBUTED POWER FACTOR CORRECTION AND PHASE BALANCING

RELATED APPLICATIONS

The present application claims priority to U.S. Provisional Application Ser. No. 61/269,504, filed Jun. 24, 2009, entitled "System and Method for Distributed Power Factor Correction Synchronized by Local Utility," which is assigned to the assignee hereof and hereby expressly incorporated by reference.

FIELD OF THE INVENTION

At least some embodiments of the disclosure relate to power management and, more particularly but not limited to, systems and methods for distributed power factor correction.

BACKGROUND

The electric power grid has become more distributed. More localized electrical generation facilities operated by users produce an ever greater share of electricity. As the prevalence of localized electrical general facilities increases, more and more electronic loads localized throughout the grid increase problems of power factor (PF).

The PF typically refers to the relationship between current and voltage in an alternating current (AC) electric power system. The PF of an AC electric power system can be defined as the ratio of the real power flowing to a load to the apparent power that is seemingly being drawn from a power source. PF typically is a number between 0 and 1, and is frequently expressed as a percentage. Real power can be understood as the capacity of a circuit to perform work in a particular time. Apparent power can be understood as the product of the current and the voltage of the circuit.

SUMMARY

Systems and methods in accordance with the present invention are described herein. Some embodiments are summarized in this section.

In one embodiment, a power management system includes a plurality of monitors, communicatively coupled together over a communications medium. Each respective monitor of the plurality of monitors is configured to capture power factor (PF) data at a corresponding distribution segment for calculation of a PF correction.

In one embodiment, the system includes polyphase electric power having a first phase with a high load compared to a second phase. The first phase receives power to compensate for the high load and to balance the first phase and the second phase.

In one embodiment, the first phase receives the power without a need to calculate the PF correction.

Many other features and embodiments of the present invention will be apparent from the accompanying drawings and from the following detailed description.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In an ideal situation for an electric power system, the PF has value of 1.0. When the PF is 1.0, the current behaves as if a normal resistive load were present, and the current curve (or waveform) exactly follows the voltage curve. However, because energy can be stored in a load and returned to a power source, or because a non-linear load can distort the wave shape of the current drawn from the power source, the apparent power can be greater than the real power. In this regard, many electronic devices or appliances connected to the electric power grid in reality do not behave ideally. As a result, for larger loads, a PF correction is typically required. Even small loads can distort the PF dramatically. In addition, interaction between different devices connected to the grid can lead to further distortion of the PF.

In one embodiment, systems and methods of correcting the PF in a synchronized manner are disclosed to balance local regions of the electric power grid so that in the local regions the PF can be maintained at a value of 1 (one), or optimized to be as close as possible to that value. In one embodiment, the PF is monitored in the local regions and PF correction commands are sent to both local loads and local generators to dynamically adapt the PF to have a value of 1.

Figure 1:
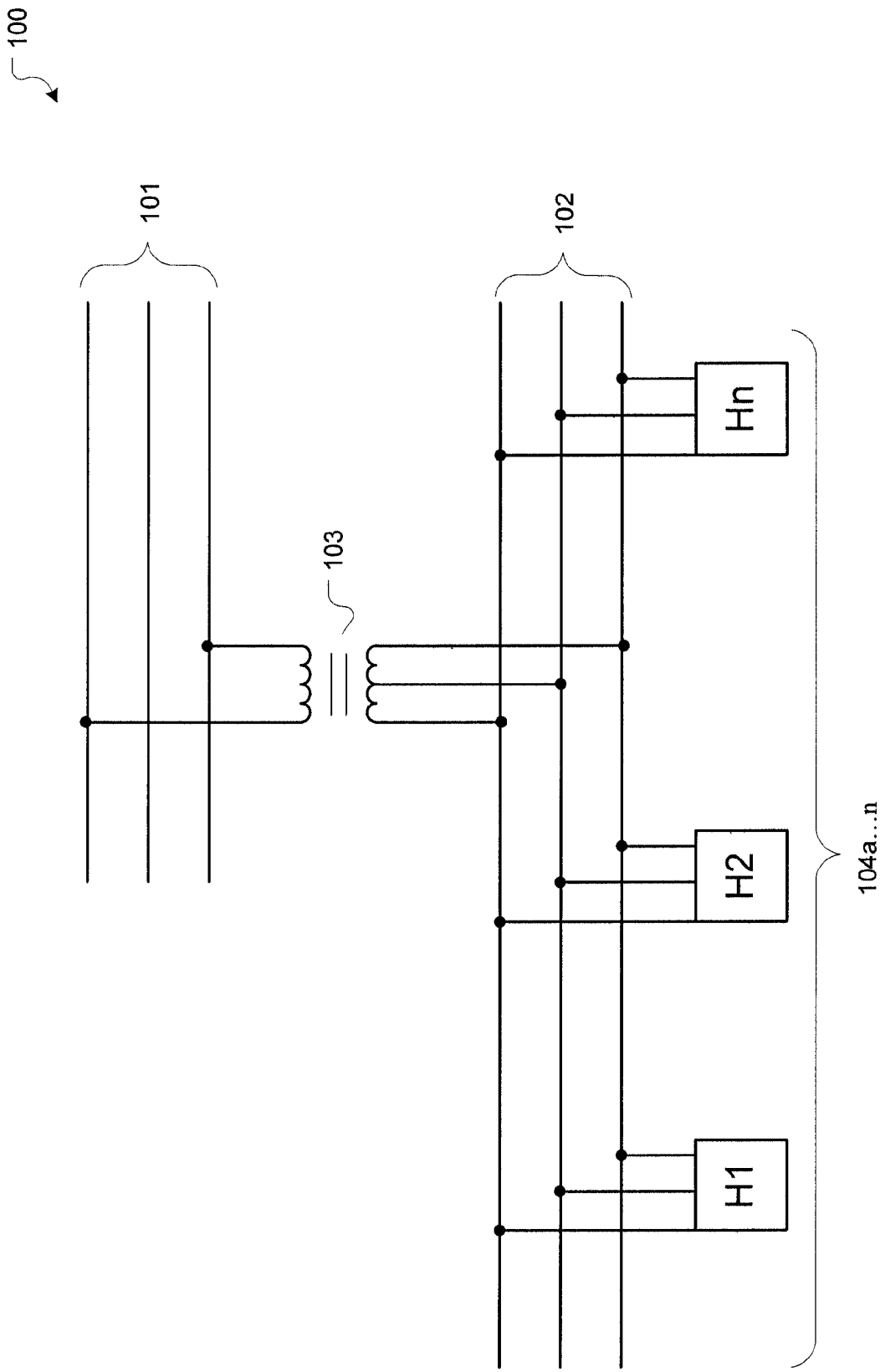
FIG. 1 shows a first electric utility distribution grid according to one embodiment.

FIG. 1 shows an exemplary electric utility distribution grid (DG) 100 that is typical of the kinds of grids, for example, deployed in the United States. The DG 100 includes a grid distribution segment 101. In one embodiment, the distribution segment 101 may be a two- or three phase electric power system. In one embodiment, the distribution segment 101 may be at a medium to high voltage level. The distribution segment 101 is coupled to a two phase distribution transformer 103 that feeds into a local distribution segment 102. In one embodiment, the local distribution segment 102 may be a two phase electric power system with a neutral conductor. In one embodiment, the local distribution segment 102 may be at a low voltage level. The local distribution segment 102 may be a residential subdivision having a number of homes H1-Hn 104a-n. In one embodiment, the number of homes H1-Hn 104a-n may be limited.

Figure 2:
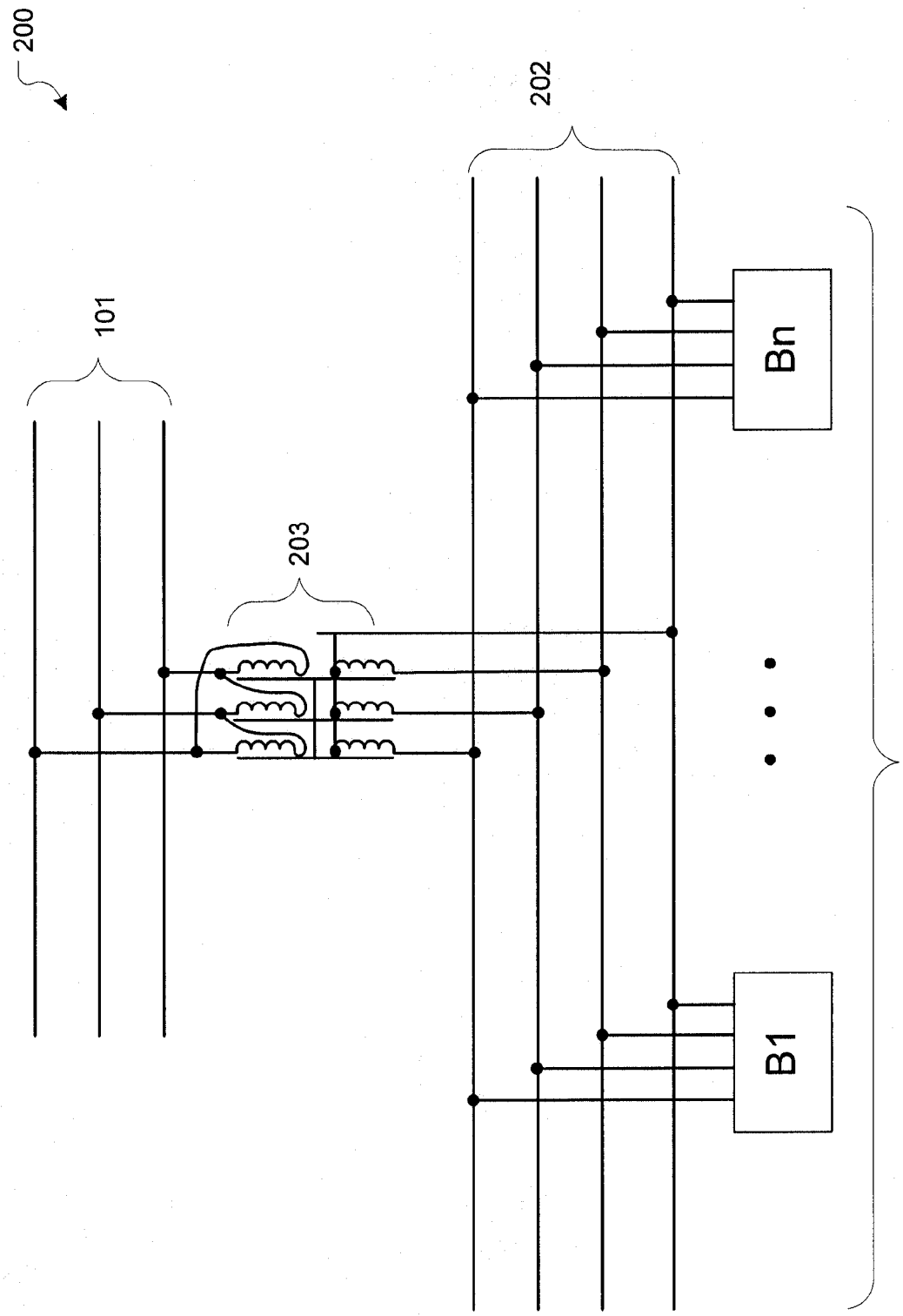
FIG. 2 shows a second electric utility distribution grid according to one embodiment.

FIG. 2 shows an exemplary electric utility distribution grid (DG) 200 that is typical of the kind of grids deployed in Europe and serving commercial or industrial areas in the United States. The DG 200 includes the distribution segment 101. In one embodiment, the distribution segment 101 may be a three phase electric power system. In one embodiment, the distribution segment 101 may be at a medium to high voltage level. The distribution segment 101 is coupled to a three phase distribution transformer 203 that feeds into a local distribution segment 202. In one embodiment, the local distribution segment 202 may be a four wire, three phase electric power system with a neutral conductor. In one embodiment, the local distribution segment 202 may be at a low voltage level. The local distribution segment 202 may be a commercial subdivision having buildings B1-Bn 204a-n. In one embodiment, the commercial subdivision may be a strip mall or other cluster of commercial buildings.

In one embodiment, the distribution segment 202 may include a single building connected to the transformer 203. In one embodiment, the distribution segment 202 may include hundreds of buildings connected to the transformer 203.

In one embodiment, the transformer 203 is a three phase (or tri phase) transformer. In one embodiment, the transformer 203 may have a triangle-shaped connection on the primary winding side. In one embodiment, the transformer may have a star-shaped connection on the secondary winding side to provide a neutral wiring point.

In one embodiment, the transformer 203 may couple three conductors of the distribution segment 101 to four conductors of the local distribution segment 202. In one embodiment, the transformer may couple three conductors of the distribution segment 101 to seven conductors (not shown) of the local distribution segment 202.

In one embodiment, the transformer 203 may be replaced with more than one transformer in many different possible configurations.

Figure 3:
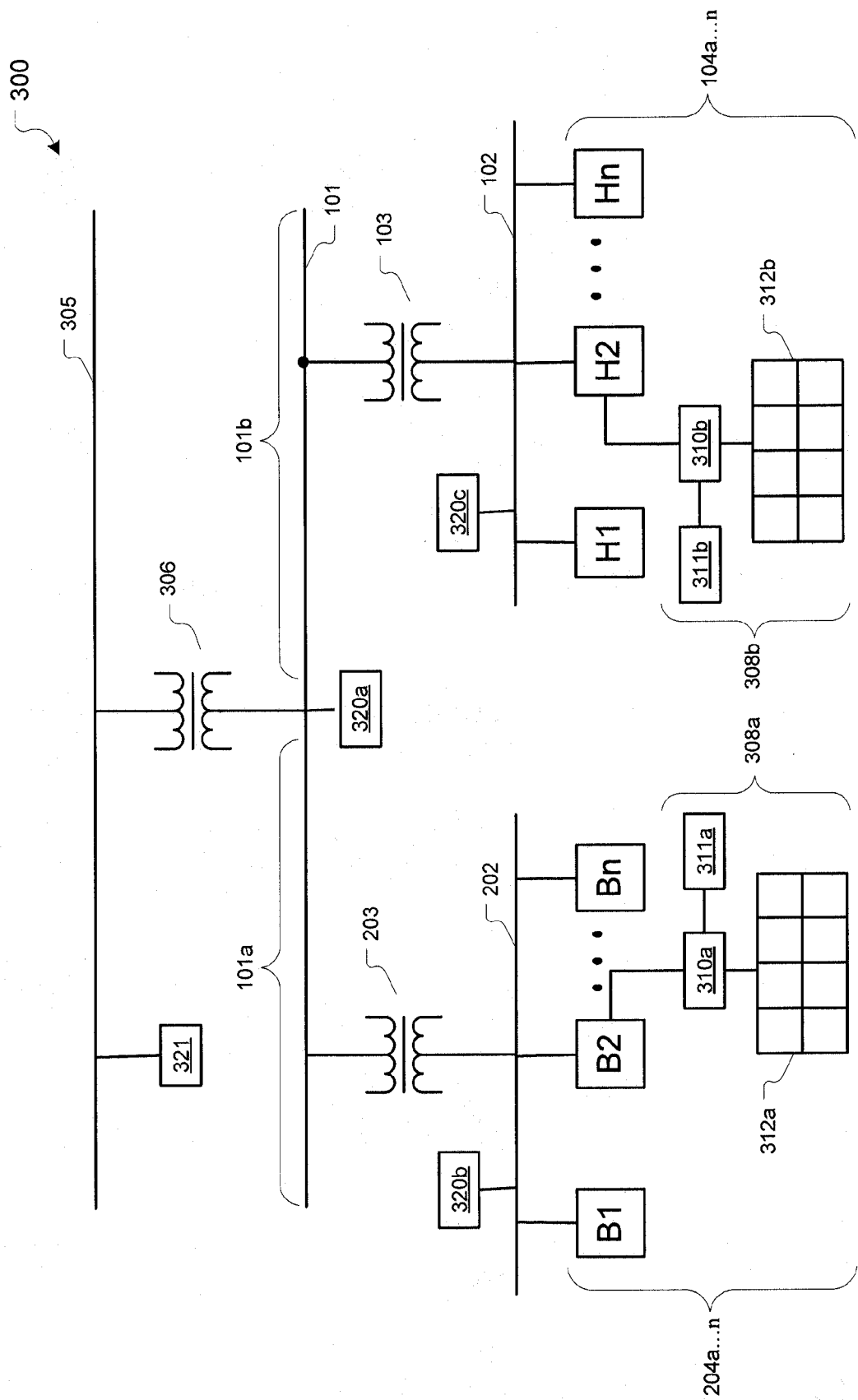
FIG. 3 shows a third electric utility distribution grid according to one embodiment.

FIG. 3 shows a simplified, exemplary view of a system 300 according to one embodiment. The system 300 includes a high voltage distribution grid (DG) 305. In one embodiment, the DG 305 may be a three phase electric power system. In one embodiment, the DG 305 may be at a high voltage level. The DG 305 includes a substation 306 feeding into the distribution segment 101. In one embodiment, distributions segments in addition to the distribution segment 101 may be coupled to the DG 305. In one embodiment, substations in addition to the substation 306 may feed into the distribution segments.

The distribution segment 101 includes a distribution segment 101a and a distribution segment 101b. The distribution segment 101a and the distribution segment 101b mirror the embodiments shown in, respectively, FIG. 2 and FIG. 1. The distribution segment 101a may be a three phase electric power system feeding into the three phase distribution transformer 203 and into the three phase local distribution segment 202. The distribution segment 101b may be a two phase electric power system feeding into the two phase distribution transformer 103 and into the two phase local distribution segment 102. The local distribution segment 102 and the local distribution segment 202 then may send power to, respectively, the homes H1-Hn 104a-n and the buildings B1-Bn 204a-n.

In one embodiment, distribution segments in addition to the distribution segment 101a and the distribution segment 101b may be included in the distribution segments 101. In one embodiment, the distribution segments may be two phase or three phase electric power systems.

The system 300 includes a solar system 308a and a solar system 308b. The solar system 308a includes an inverter 310a, a controller 311a, and a solar panel array 312a. The solar system 308b includes an inverter 310b, a controller 311b, and a solar panel array 312b. The inverter 310a is controlled by the controller 311a. The inverter 310b is controlled by the controller 311b. A building B2 of the buildings B1-Bn 204a-n is connected to the solar panel array 312a through the inverter 310a. A home H2 of the homes H1-Hn 104a-n is connected to the solar panel array 312b through the inverter 310b. The controller 311a and the controller 311b have the ability to communicate data, and, importantly, to receive instructions, both of a general type and for real time execution.

In one embodiment, solar systems in addition to the solar system 308a and the solar system 308b may be included in the system 300.

The system 300 includes PF monitor (or controller) 320a, PF monitor (or controller) 320b, and PF monitor (or controller) 320c. The PF monitor 320a, the PF monitor 320b, and the PF monitor 320c may be located in different sections or levels of the system. The PF monitor 320a, the PF monitor 320b, and the PF monitor 320c may function as controllers.

In one embodiment, the PF monitor 320a is coupled to the distribution segment 101. The PF monitor 320b is coupled to the local distribution segment 202. The PF monitor 320c is coupled to the local distribution segment 102. The PF monitor 320b may monitor the PF at the local distribution segment 202. Based upon the monitoring, PF correction commands may be provided to the controller 311a so that the inverter 310a may deliver electric power so that the PF may reach or be optimized to approach a value of 1 in the local distribution segment 202. Likewise, the PF monitor 320c may monitor the PF at the local distribution segment 102. Based upon the monitoring, PF correction commands may be provided to the controller 311b so that the inverter 310b may deliver electric power so that the PF may reach or be optimized to approach a value of 1 in the local distribution segment 102. In another embodiment, a PF monitor may monitor imbalances between phases, whether two, three or other poly-phases are involved. In yet another embodiment, a PF monitor may monitor both imbalances and PFs, on all phases, and transmit said information as data.

The system 300 includes a grid master controller 321. In one embodiment, the grid master controller 321 is administered by an electric utility or similar company. In one embodiment, the grid master controller 321 is coupled to the DG 305. In one embodiment, the grid master controller 321 receives PF data, including monitoring information, load factors, and other parameters affecting the PF, from the PF monitor 320a, the PF monitor 320b, and the PF monitor 320c and, based on the PF data, may perform a calculation to determine localized PF corrections. The grid master controller 321 may provide a command to the controller 311a or the controller 311b, or both, to apply the PF corrections.

In one embodiment, the grid master controller 321 need not be physically connected to the DG 305. The grid master controller 321 may be made aware of phase and PF data in any part of the system 300 by any of numerous information communication means that are well known.

In one embodiment, the calculation to determine a localized PF correction may not be performed by the master grid controller 321. In one embodiment, the calculation to determine a localized PF correction may be performed by the PF monitor 320a, the PF monitor 320b, and/or the PF monitor 320c. The PF monitor 320a, the PF monitor 320b, and the PF monitor 320c, each or in combination, may provide a command to the corresponding controller 311a or the controller 311b, or both, to apply the localized PF correction. In one embodiment, the master grid controller 321 may provide a clock signal to or synchronization of the controller 311a and the controller 311b.

In one embodiment, the master grid controller 321, the PF monitor 320a, the PF monitor 320b, and the PF monitor 320c in various combinations may perform calculations to determine localized PF corrections. For example, the PF monitor 320b and the PF monitor 320c together may eliminate the need for the PF monitor 320a.

In one embodiment, the PF monitor 320a, the PF monitor 320b, and the PF monitor 320c are distributed in the system 300 and communicatively coupled or networked together, as well as with the master grid controller 321. In one embodiment, communications among the master grid controller 321, the PF monitor 320a, the PF monitor 320b, and the PF monitor 320c may be transmitted over power lines. In one embodiment, communications may be transmitted by wireless signal, over Internet connections, by satellite, by laser, by microwave or by any or a combination of various means that are currently well known.

Figure 4:
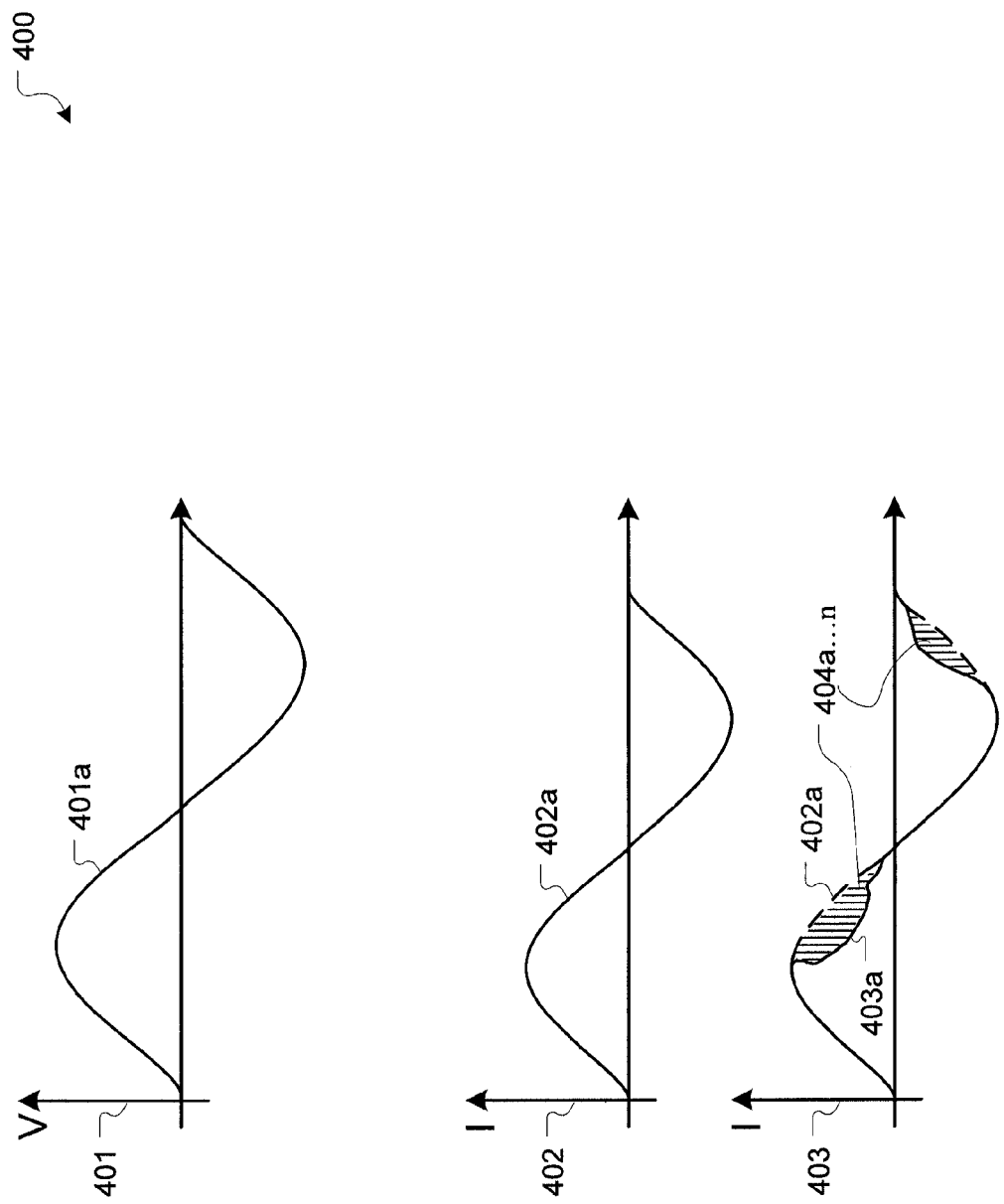
FIG. 4 shows a graph illustrating voltage and current according to one embodiment.

FIG. 4 shows three graphs 401, 402, and 403. The graph 401 shows ideal voltage 401a as a sine curve. The graph 402 shows ideal current 402a as a sine curve corresponding to the voltage 401a in the graph 401.

The graph 403 shows actual current 403a that is distorted by one or more electronic appliances in or associated with the homes H1-Hn 104a-n and/or the buildings B1-Bn 204a-n. The graph 403 also shows the ideal current 402a as a dotted line. The PF distortion caused by the electronic appliances may cause the actual current 403a to diverge from the ideal current 402a. The PF distortions are represented by shaded areas 404a-n. In these examples, the extent of distortion is exaggerated to make it clearly visible, but actual distortion may vary. Although examples shown are for a single-phase, analogous multi-phase corrections can be made, including also but not limited to phase imbalances. In those cases, for example, in a two phase system (or other polyphase electric power system), more energy may be fed into one phase as to compensate for higher load on that phase. This can be done, even if no PF correction is required, or along with a PF correction. Likewise, for a three phase system (or other polyphase electric power system), more or less power can be fed into each of the three phases at any given time, even if no PF correction is required, or along with a PF correction.

In some cases, the PF distortion may be a phase shift of the current versus the voltage that may be caused, for example, by capacitive or inductive loads. In one embodiment, the PF distortion may be more complicated because electronic appliances can distort the current waveform. The load represented by the electronic appliances can change over time. Accordingly, in one embodiment, the PF correction for a load may be continuously calculated and applied in real time.

Figure 5:
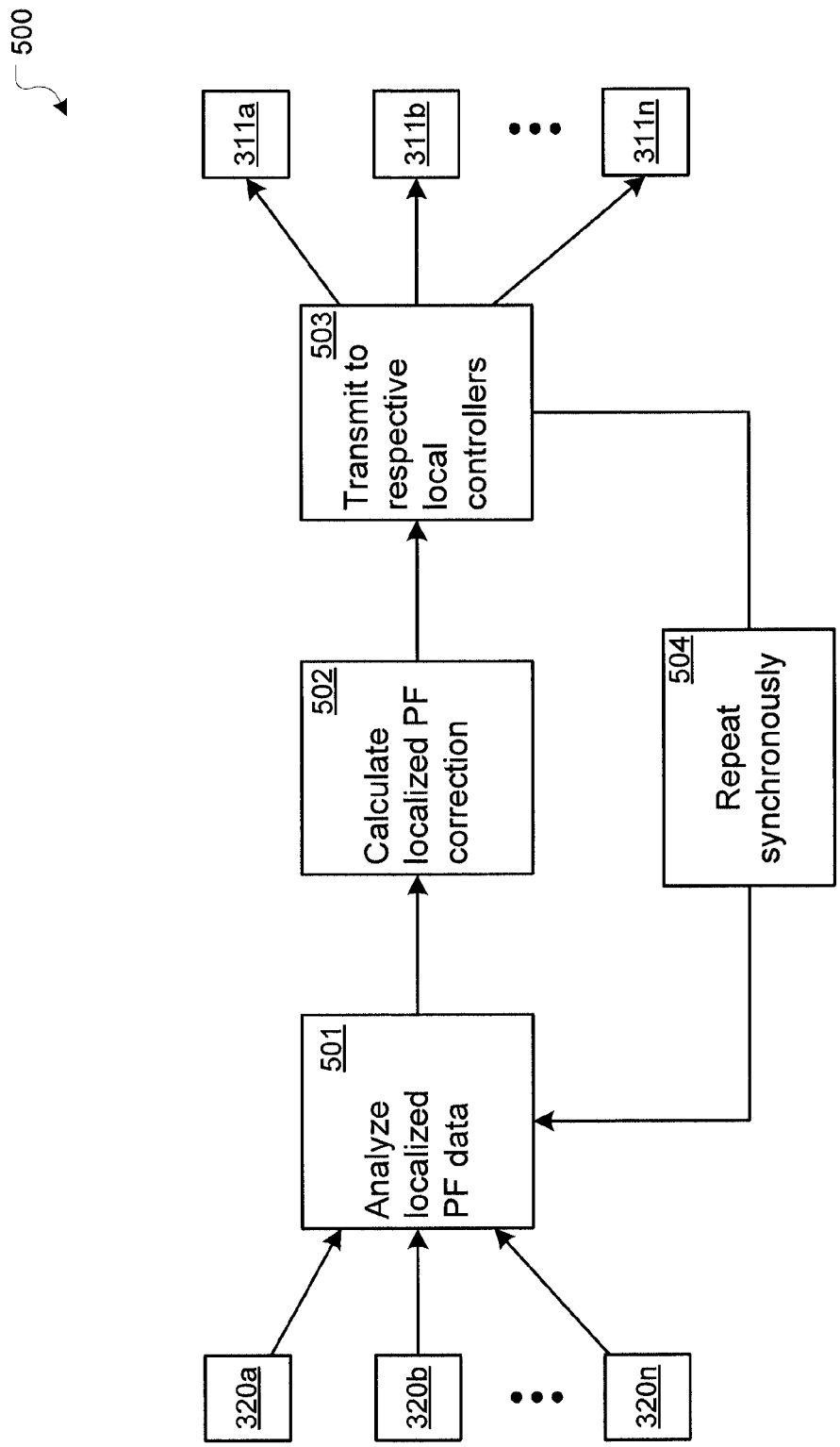
FIG. 5 shows a flow process according to one embodiment.

FIG. 5 shows a flow process 500 for performing distributed PF management according to an embodiment. PF data, including the localized PF values obtained from the localized PF monitor 320a, the PF monitor 320b, and the PF monitor 320c, are measured. The PF data is then communicated to the master grid controller 321. In process 501, the master grid controller 321 analyzes the PF data for the grid distribution segment 101, the local distribution segment 202, and/or the local distribution segment 102. In process 502, the master grid controller 321 calculates the localized PF correction. In process 503, the master grid controller 321 transmits the calculated PF correction to the controller 311a of the solar system 308a and/or the controller 311b of the solar system 308b so that the local PF can be optimized. In process 504, the master grid controller 321 continuously and synchronously repeats this process.

In one embodiment, the process 501 and the process 502 to determine the PF correction may be performed by any or a combination of the local PF monitors 320a, 320b, or 320c.

In one embodiment, the master grid controller 321, the PF monitor 320a, the PF monitor 320b, and the PF monitor 320c may execute software to perform the flow process 500.

In one embodiment, the master grid controller 321 may provide the synchronization of the PF monitors 320a, 320b, and 320c. The PF monitors 320a, 320b, and 320c, in turn, may control controllers 311a and 311b by providing local PF corrections. In one embodiment, a monitor may control neighboring distribution segments. For example, the monitor 320b may control neighboring segments, such as the local distribution segment 102 and/or additional distribution segments, in addition to the local distribution segment 202 associated with the monitor 320b.

In one embodiment, the master grid controller 321 may calculate the local PF correction and may also calculate additional data, such as requirements of a power company, a PF based on immediately neighboring segments or units, etc.

In one embodiment, communications to the controllers 311a and 311b that control the inverters 310a and 310b of the solar systems 308a and 308b may be performed by the PF monitors 320a, 320b, and 320c or by the master grid controller 321 or other head-end device.

In one embodiment, despite the occurrence of some latencies, a unified time base, or heartbeat, may be achieved by synchronizing the master grid controller 321, the PF monitor 320a, the PF monitor 320b, the PF monitor 320c, the controller 311a, and the controller 311b. Synchronization of the master grid controller 321, the PF monitor 320a, the PF monitor 320b, the PF monitor 320c, the controller 311a, and the controller 311 allows them to run in correct phase with respect to the grid. Synchronization may involve a one phase or two phase (or cycle) delay in the PF correction. A small latency of one or two cycles may be acceptable as the changes in the PF typically may occur over multiple cycles, and not from one cycle to the next.

In one embodiment, the PF correction commands may be sent to the controllers 311a and 311b in real time. In one embodiment, the PF correction commands may be sent to the controllers 311a and 311b at a rate of approximately 60 times per second or other applicable grid frequency (for example, 50 Hz in Europe, etc.). In one embodiment, the PF correction commands may be sent at other rates, for example but not limited to once every 5 or 10 grid cycles, every one or few seconds, etc.

In some cases, an "auto-mode" may be deployed, in which the device corrects the distortion present at the local connection.

In one embodiment, a phase shift may be communicated to the local controllers 311a and 311b as the PF correction.

In one embodiment, the inverters 310a and 310b may be capable of producing more than a phase shift. Accordingly, in one embodiment, a selection of a predefined PF correction with one or more parameters may be sent to the controllers 311a and 311b. In one embodiment, a compressed graph of the desired V/I diagram or other waveform and phase as the PF correction may be sent to the controllers 311a and 311b.

In one embodiment, the PF correction may be achieved by instructing the controllers 311a and 311b differently so that the additive result of the electric energy delivered by the inverters 310a and 310b may provide the desired PF.

In one embodiment, the master grid controller 321 may send a command to apply an unbalanced distribution of power that results in a best possible PF correction based on the energy available.

From the perspective of billing for delivery of electrical power, conventional power meters may not account correctly for PF corrections. To properly account for PF corrections, a new type of power meter may be used, or the PF correction commands may be summed as a total correlation factor to be reflected on a bill of a power company for consumption of power. Typically, a power meter counts effective power (PF=1.0) fed into a system, hence a utility-side requested PF correction could not account for the correct amount of power supplied, as it will result at the meter in a PF<1.0. Additional data showing requested PF corrections, the type of PF correction, as well as the duration of the PF correction may be recorded. The additional data may result in an additional credit being issued to the electrical power producer (e.g., the solar system 308a, 308b) to compensate for the inability of a power meter to account for the requested PF corrections. A power meter may have a built in function, or may be involved in the communication of the PF correction, and hence account for the PF correction. A correcting PF monitor (or controller) may keep a separate log of PF corrections to generate additional credits with the power company computer for correct billing.

In one embodiment, rather than correcting only the waveform of the power delivered, the master grid controller 321, and/or the PF monitor 320a, the PF monitor 320b, the PF monitor 320c, and other controllers, may be used to balance different amounts of power between different phases, in either two phase, three phase, or six phase systems. Such balancing may be exclusive of or in addition to PF correction, as discussed above. This may also need special meters and or additional meter corrections to reflect the "true value" generated at any given site. For example, if a solar system 308a, 308b creates 1 kWh, but sends it in with a PF of 0.5, the solar system 308a, 308b might be credited for only 0.5 kWh. In this example, the solar system 308a, 308b has performed a valuable service for the power company, and perhaps should receive a compensation of 1.1 kWh, or at least the "true value" of the 1 kWh that was provided.

In one embodiment, the system 300 relates to solar power generation through the solar systems 308a and 308b. In one embodiment, the system 300 can be implemented with any other kind of local power generation, including but not limited to wind, water, geothermal, bio gas, etc. wherein a controller is used to modify/control a power inverter to achieve the desired PF correction(s).

Figure 6:
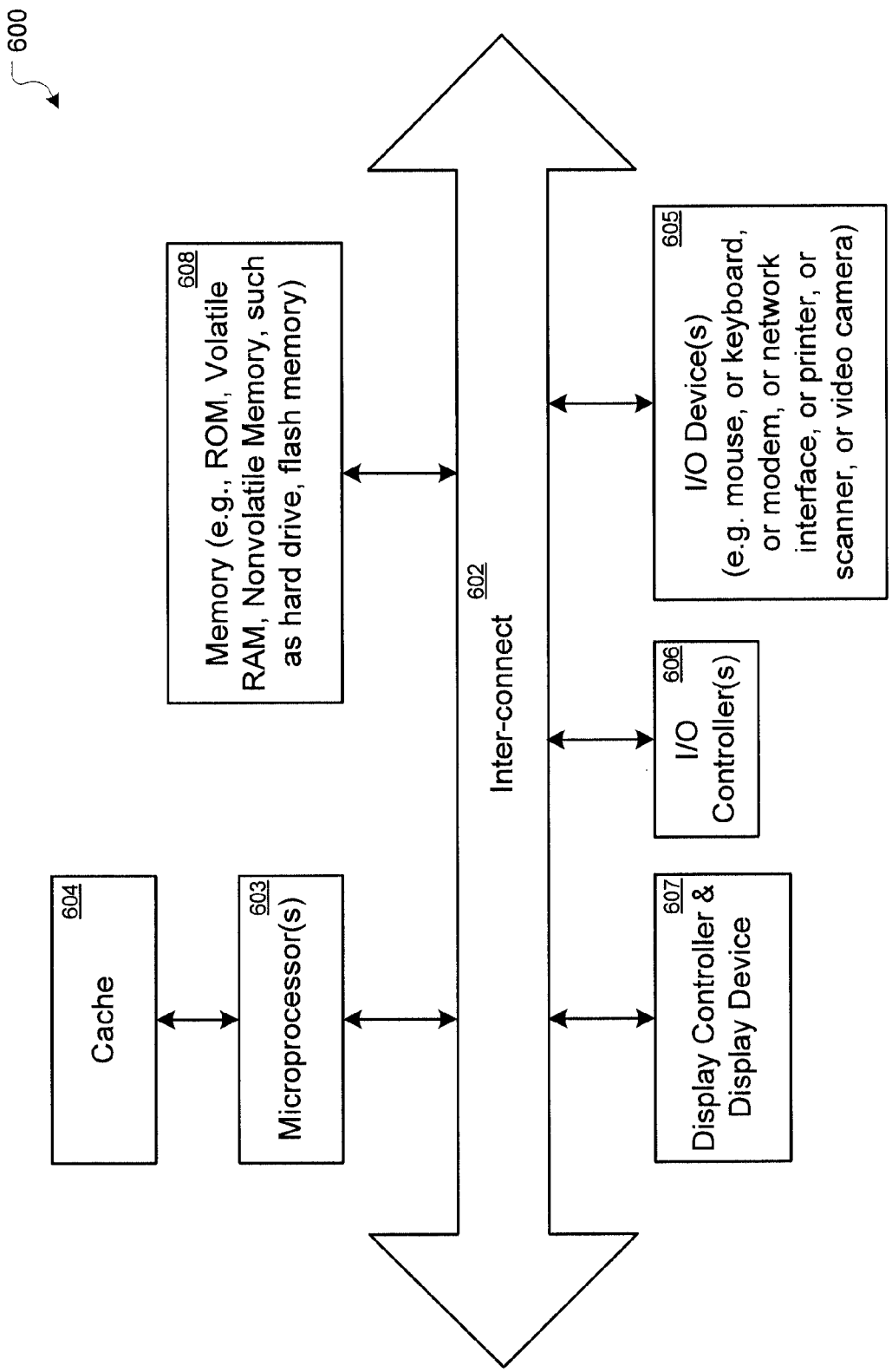
FIG. 6 shows a system according to one embodiment.

FIG. 6 illustrates a data processing system 600. In one embodiment, the data processing system 600 may be used to implement the master grid controller 321, the PF monitor 320a, the PF monitor 320b, and/or the PF monitor 320c. While FIG. 6 illustrates various components of a computer system, it is not intended to represent any particular architecture or manner of interconnecting the components. Some embodiments may use other systems that have fewer or more components than those shown in FIG. 6.

In FIG. 6, the data processing system 600 includes an inter-connect 602 (e.g., bus and system core logic), which interconnects a microprocessor(s) 603 and memory 608. The microprocessor 603 is coupled to cache memory 604 in the example of FIG. 6.

The inter-connect 602 interconnects the microprocessor(s) 603 and the memory 608 together and also interconnects them to a display controller and display device 607 and to peripheral devices such as input/output (I/O) devices 606 through an input/output controller(s) 606. Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect 602 may include one or more buses connected to one another through various bridges, controllers and/or adapters. In one embodiment the I/O controller 606 includes a USB (Universal Serial Bus) adapter for controlling USB peripherals, and/or an IEEE-1394 bus adapter for controlling IEEE-1394 peripherals.

The memory 608 may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific embodiments thereof. It will be evident that various modifications may be made thereto without departing from the broader spirit and scope as set forth in the following claims. The specification and drawings are, accordingly, to be regarded in an illustrative sense rather than a restrictive sense.

We claim:

1. A power management system, comprising:
a plurality of monitors, each respective monitor of the plurality of monitors configured to capture power factor (PF) data at a corresponding distribution segment, wherein transformers separate distribution segments of a power distribution system;
at least one solar system coupled to the distribution segment, wherein
the distribution segment is connected to a plurality of loads that draw electric power from the distribution segment, including electric power generated by the solar system,
the solar system includes
a solar panel array,
an inverter couples the solar panel array to the distribution segment, and
a solar system controller configured to control the inverter to provide the electric power generated by the solar panel array in a form correcting a power factor on the distribution segment based on an additive result of the electric power provided by the inverter with respect to power consumed on the distribution segment by the plurality of loads; and
a master grid controller communicatively coupled to the plurality of monitors and
the solar system controller, wherein the master controller
receives the power factor (PF) data input from captured by the plurality of monitors,
analyzes the power factor (PF) data to determine desired power factor corrections, and
sends the desired power factor corrections to the solar system controller in the solar system.

2. The system of claim 1, wherein the power distribution system includes a plurality of phases; and the master grid controller is configured to balance power amounts among between phases.

3. The system of claim 1, wherein the desired power factor corrections include a representation of a desired V/I diagram.

4. The system of claim 1, wherein the desired power factor corrections include a representation of a waveform.

5. A power management system, comprising:
a plurality of monitors, each respective monitor of the plurality of monitors configured to capture real time power factor (PF) data at a corresponding distribution segment wherein transformers separate distribution segments of a power distribution system; and
a master grid controller communicatively coupled to the plurality of monitors and configured to receive power factor data of a distribution grid coupled with the power distribution system via a transformer, wherein the distribution segment includes at least one power generator and a plurality of loads consuming electricity drawn from the distribution grid and electricity generated by the power generator; each
the respective monitor is configured to provide communicate the real time power factor (PF) data to the master grid controller;
the master grid controller is configured to receive the real time power factor (PF) data for calculation of desired power factor corrections and transmit the desired power factor corrections to a controller of the power generator, wherein the controller of the power generator is configured to control power output from the power generator to the distribution segment according to the desired power factor corrections to correct a power factor on the distribution segment based on an additive result of the power output from the power generator with respect to power consumed by the plurality of loads.

6. The system of claim 5, wherein the desired power factor corrections include identify a desired phase shift.

7. The system of claim 5, wherein the desired power factor corrections include a graph of a desired waveform.

8. The system of claim 5, wherein
the distribution segment includes polyphase electric power having a first phase and a second phase,
power consumed in the distribution segment on the first phase is greater than power consumed in the distribution segment on the second phase to have mismatch in power consumption in the first phase and the second phase, and power output from the power generator on the first phase is controlled to be greater than power output from the power generator on the second phase to compensate for the mismatch and to balance the first phase and the second phase.

9. A method of power management, the method comprising:
analyzing power factor (PF) data of a plurality of distribution segments connected to an electric power grid, wherein transformers separate the distribution segments, wherein a first distribution segment of the plurality of distribution segments includes
a set of transmission lines,
a plurality of loads drawing power from the set of transmission lines, and
at least one power generating system providing power to the set of transmission lines;
calculating a desired power factor (PF) correction for the first distribution segment of the plurality of distribution segments to optimize a power factor in the set of transmission lines of the first distribution segment; and
transmitting the desired power factor (PF) correction to a controller of the power generating system to control output of power from the power generating system to the set of transmission lines to optimize the power factor in the set of transmission lines of the first distribution segment based on an additive result of the output of power with respect to power consumed by the plurality of loads.

10. The method of claim 9, further comprising:
monitoring a plurality of locations at various voltage levels in the plurality of distribution segments to generate the power factor (PF) data.

* * * * *